(12) United States Patent
Zhang et al.

(10) Patent No.: US 12,528,193 B2
(45) Date of Patent: Jan. 20, 2026

(54) ROBOT CALIBRATION METHOD, ROBOT AND COMPUTER-READABLE STORAGE MEDIUM

(71) Applicant: UBTECH ROBOTICS CORP LTD, Shenzhen (CN)

(72) Inventors: Shuo Zhang, Shenzhen (CN); Zheng Xie, Shenzhen (CN); Yizhang Liu, Shenzhen (CN); Zhihao Zhang, Shenzhen (CN); Yingfu Zeng, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 234 days.

(21) Appl. No.: 18/369,858

(22) Filed: Sep. 19, 2023

(65) Prior Publication Data
US 2024/0001558 A1 Jan. 4, 2024

Related U.S. Application Data

(63) Continuation of application No. PCT/CN2021/124617, filed on Oct. 19, 2021.

(30) Foreign Application Priority Data

Mar. 19, 2021 (CN) .......................... 202110296720.7

(51) Int. Cl.
*B25J 9/16* (2006.01)
(52) U.S. Cl.
CPC ........... *B25J 9/1692* (2013.01); *B25J 9/1697* (2013.01)
(58) Field of Classification Search
CPC . B25J 9/1692; B25J 9/1697; B25J 9/08; B25J 9/1656; B25J 9/1679; G05B 2219/39016
See application file for complete search history.

(56) References Cited

U.S. PATENT DOCUMENTS 9,188,973 B2 * 11/2015 Tenney ................. H04N 7/181
10,373,336 B1 * 8/2019 Islam ..................... B25J 9/1697
(Continued)

FOREIGN PATENT DOCUMENTS

CN 109807885 A 5/2019
CN 112045682 A 12/2020

OTHER PUBLICATIONS

ISR for PCT/CN2021/124617.
Written opinions of ISA for PCT/CN2021/124617.

*Primary Examiner* — Adam R Mott
*Assistant Examiner* — Matthew C Gammon (57) ABSTRACT

A robot calibration method, a robot, and a computer-readable storage medium are provided. The method includes: obtaining operation space information of the execution end of the robot; obtaining operation space points after gridding an operation space of the robot by gridding the operation space based on the operation space information; obtaining calibration data by controlling the execution end to move to the operation space points meeting a preset requirement; and calibrating the hand and the image detection device of the robot based on the obtained calibration data. In this manner, the operation space points are determined by gridding the operation space based on the operation space information, and the execution end can be automatically controlled to move to the operation space points that meet the preset requirements so as to obtain the calibration data in an automatic and accurate manner, thereby simplifying the calibration process and improving the efficiency.

20 Claims, 6 Drawing Sheets

(56) References Cited

U.S. PATENT DOCUMENTS

| | | | | |
|---|---|---|---|---|
| 2008/0298672 A1* | 12/2008 | Wallack | ............... | G06T 7/73 |
| | | | | 382/154 |
| 2011/0280472 A1* | 11/2011 | Wallack | ............... | G06T 7/80 |
| | | | | 901/14 |
| 2014/0118500 A1* | 5/2014 | Liu | ............... | G06T 7/80 |
| | | | | 348/46 |
| 2014/0240520 A1* | 8/2014 | Liu | ............... | G06T 7/80 |
| | | | | 348/187 |
| 2015/0088311 A1* | 3/2015 | Suzuki | ............... | B25J 9/1697 |
| | | | | 700/254 |
| 2017/0032537 A1* | 2/2017 | Li | ............... | G06T 7/80 |

* cited by examiner

ROBOT CALIBRATION METHOD, ROBOT AND COMPUTER-READABLE STORAGE MEDIUM

CROSS REFERENCE TO RELATED APPLICATIONS

The present disclosure is a continuation-application of International Application PCT/CN2021/124617, with an international filing date of Oct. 19, 2021, which claims foreign priority of Chinese Patent Application No. 202110296720.7, filed on Mar. 19, 2021 in the State Intellectual Property Office of China, the contents of all of which are hereby incorporated by reference.

BACKGROUND

1. Technical Field

The present disclosure relates to robot technology, and particularly to a robot calibration method, a robot, and a computer-readable storage medium are provided.

2. Description of Related Art

With the rapid development of artificial intelligence technology, various intelligent products such as intelligent robots have emerged, and the robots are playing more and more important roles in various fields. At present, many types of robots control, with the cooperation of machine vision, the execution end to move to the destination so as to perform corresponding operations. In order to control the execution end to move to the destination accurately for performing corresponding operations, it is necessary to calibrate the hand and the eye (i.e., the image detection device) of the robot before performing the corresponding operations.

However, during the calibration, it is necessary to collect calibration data from as many positions as possible, otherwise the calibration will be inaccurate and cannot control the execution end to move to the destination accurately. At present, in the process of collecting the calibration data of the calibration object from as many positions as possible, there is a part that requires manual participation which is relatively complicated and has high requirement in the professional quality of the operators. Consequently, the calibration process is cumbersome and low efficiency.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be understood that, the drawings in the following description merely show some embodiments. For those skilled in the art, other drawings can be obtained according to the drawings without creative efforts.

DETAILED DESCRIPTION

In the following descriptions, for purposes of explanation instead of limitation, specific details such as particular system architecture and technique are set forth in order to provide a thorough understanding of embodiments of the present disclosure. However, it will be apparent to those skilled in the art that the present disclosure may be implemented in other embodiments that are less specific of these details. In other instances, detailed descriptions of well-known systems, devices, circuits, and methods are omitted so as not to obscure the description of the present disclosure with unnecessary detail.

It is to be understood that, when used in the description and the appended claims of the present disclosure, the terms "including" and "comprising" indicate the presence of stated features, integers, steps, operations, elements and/or components, but do not preclude the presence or addition of one or a plurality of other features, integers, steps, operations, elements, components and/or combinations thereof.

It is also to be understood that the term "and/or" used in the description and the appended claims of the present disclosure refers to any combination of one or more of the associated listed items and all possible combinations, and includes such combinations.

As used in the description and the appended claims, the term "if" may be interpreted as "when" or "once" or "in response to determining" or "in response to detecting" according to the context. Similarly, the phrase "if determined" or "if [the described condition or event] is detected" may be interpreted as "once determining" or "in response to determining" or "on detection of [the described condition or event]" or "in response to detecting [the described condition or event]".

In addition, in the specification and the claims of the present disclosure, the terms "first", "second", "third", and the like in the descriptions are only used for distinguishing, and cannot be understood as indicating or implying relative importance.

References such as "one embodiment" and "some embodiments" in the specification of the present disclosure mean that the particular features, structures or characteristics described in combination with the embodiment(s) are included in one or more embodiments of the present disclosure. Therefore, the sentences "in one embodiment," "in some embodiments," "in other embodiments," "in still other embodiments," and the like in different places of this specification are not necessarily all refer to the same embodiment, but mean "one or more but not all embodiments" unless specifically emphasized otherwise. The terms "comprising", "including", "having" and their variants mean "including but not limited to" unless specifically emphasized otherwise.

In the embodiments of the present disclosure, a robot calibration method maybe applied to a robot. The robot may be a robotic arm, a robotic hand, a service robot, an entertainment robot, a military robot, an agricultural robot, or the like.

For the purpose of describing the technical solutions of the present disclosure, the following describes through the embodiments below.

Figure 1:
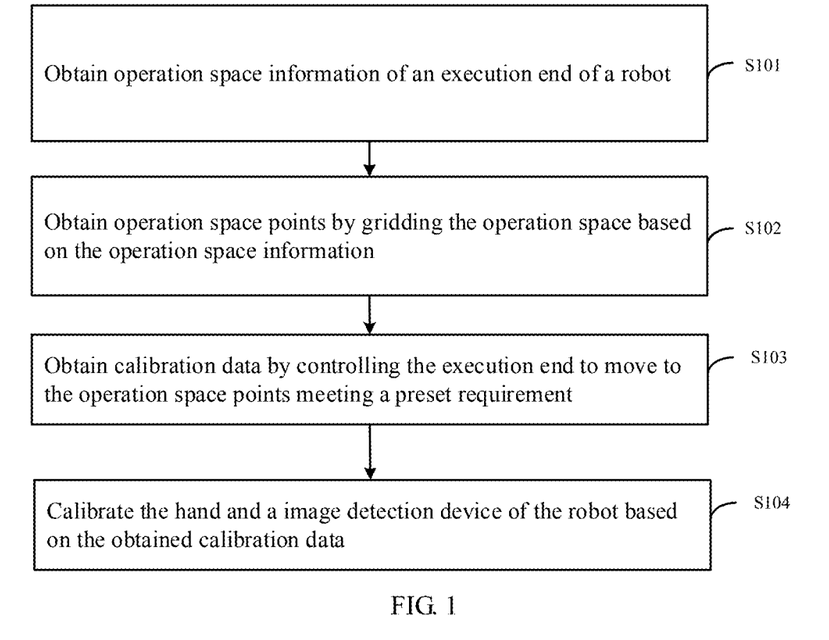
FIG. 1 is a flow chart of a robot calibration method according to an embodiment of the present disclosure.

FIG. 1 is a flow chart of a robot calibration method according to an embodiment of the present disclosure. In this embodiment, a computer-implemented method for calibration a robot is provided. The robot calibration method may be applied on (a processor of) the robot shown in FIG. 6. The robot has an execution end (i.e., end-effector) with a hand, and an image detection device. In other embodiments, the method may be implemented through a robot calibration apparatus shown in FIG. 5. As shown in FIG. 1, in this embodiment, the robot calibration method may include the following steps.

S101: obtaining operation space information of the execution end of the robot.

In this embodiment, when the robot starts to calibrate, the user may input through, for example, an input interface of the robot, the operation space information of the execution end of the robot. The operation space information may be obtained by the robot in response to detecting that the user inputs the operation space information of the execution end. Alternatively, the operation space information of the execution end of the robot may be stored in a storage device of the robot in advance, so that the pre-stored operation space information of the execution end of the robot can be obtained directly.

S102: obtaining operation space points by gridding the operation space based on the operation space information.

In this embodiment, the operation space information may include three-dimensional information of the operation space, and a plurality of operation space points may be obtained by performing grid division on the operation space based on the three-dimensional information of the operation space. The three-dimensional information of the operation space may be information such as the length, width and height of the operation space.

Figure 2:
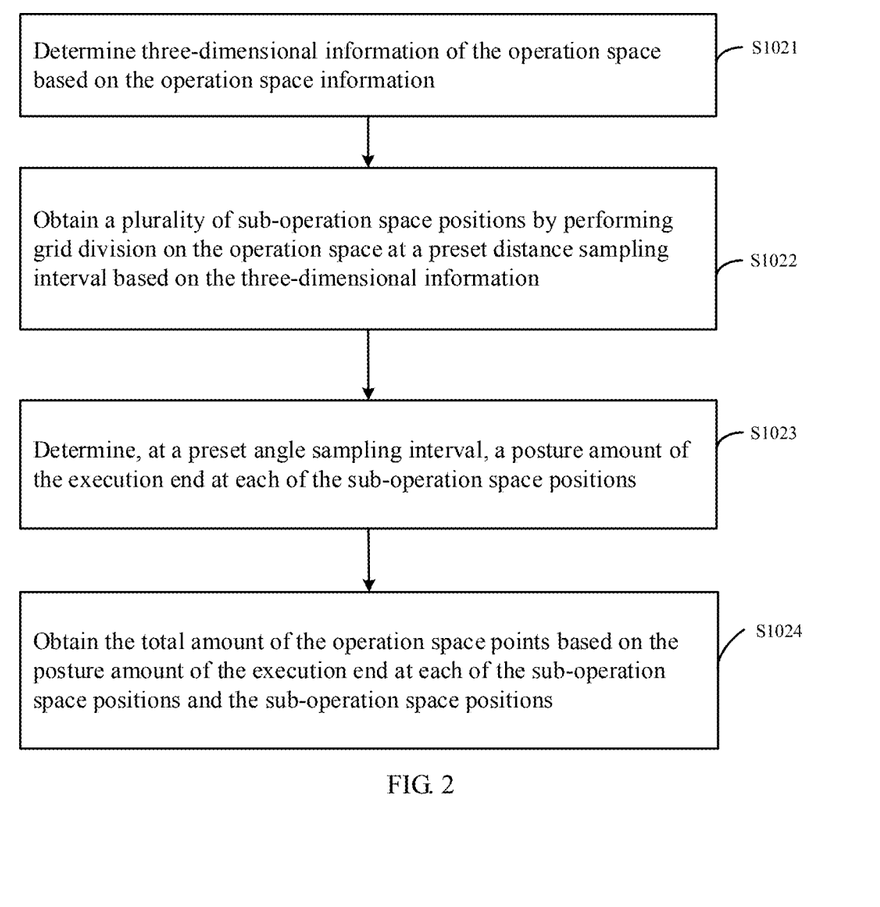
FIG. 2 is a flow chart of step S102 of the robot calibration method of FIG. 1.

FIG. 2 is a flow chart of step S102 of the robot calibration method of FIG. 1. In one embodiment, as shown in FIG. 2, step S102 of obtaining the operation space points after gridding the operation space of the robot by gridding the operation space based on the operation space information may include sub-steps S1021-S1024.

S1021: determining three-dimensional information of the operation space based on the operation space information.

In this embodiment, the three-dimensional information included in the operation space information may be obtained. In the case that the operation space is a cube, the three-dimensional information of the operation space may include information such as the length, width, and height of the operation space.

S1022: obtaining a plurality of sub-operation space positions by performing grid division on the operation space at a preset distance sampling interval based on the three-dimensional information.

In this embodiment, the distance sampling interval may be set in advance, and points of the sub-operation space positions may be obtained by performing division on each dimension with the interval of the preset distance sampling interval.

S1023: determining, at a preset angle sampling interval, a posture amount of the execution end at each of the sub-operation space positions.

In this embodiment, after obtaining the points of the sub-operation space positions, the execution end of the robot may have various postures at each point of the sub-operation space positions. For example, for a posture, if any of three attitude angles of the posture is different from another posture, they can be considered as different postures. The postures at each point of the sub-operation space positions may be obtained by determining the amount of the postures at the point of the sub-operation space positions at the preset angle sampling interval, and the amount of the postures at all the points of the sub-operation space positions may be taken as the total amount of the operation space points that can be operated in the entire operation space.

S1024: obtaining the total amount of the operation space points based on the posture amount of the execution end at each of the sub-operation space positions and the sub-operation space positions.

In this embodiment, the total amount of the operation space points that can be operated in the entire operation space may be determined based on each sub-operating space position and the determined posture amount corresponding to the sub-operating position.

In one embodiment, step S1022 of obtaining the plurality of sub-operation space positions by performing grid division on the operation space at the preset distance sampling interval based on the three-dimensional information may include: discretizing the operation space into individual grid points and moving the robot to each of the grid points. Assuming that the operation space is a cube with the length of l, the width of w, and the height of h, and the preset distance sampling interval is δd and the preset angle sampling interval is δα during the gridding, then the total amount of the sub-operation space positions that can be discretized from the operation space of the robot will be n, where $$n = \frac{l}{\delta d} \times \frac{w}{\delta d} \times \frac{h}{\delta d}.$$

Then, the amount of the postures at the execution end of each sub-operation space position is determined by sampling each point of the sub-operation space positions at the preset angle sampling interval δα. If the preset angle sampling interval is δα, and the amount of the postures that can be discretized from each sub-operating space position is m, then $$m = \frac{2\pi}{\delta \alpha} \times \frac{\pi}{\delta \alpha} \times \frac{2\pi}{\delta \alpha};$$

and the total amount of the operation space points that are operable in the entire operating space is c, where c=m×n, and all these points can be called candidate rendezvous points for sampling poses (i.e., positions and postures).

S103: obtaining calibration data by controlling the execution end to move to the operation space points meeting a preset requirement.

In this embodiment, after obtaining the total amount of the operation space points in the entire operating space, it may determine whether the corresponding operating space points meet the preset requirement. If the amount of the operating space points meets the preset requirement, the execution end of the robot may be controlled to move to the operating space points that meet the preset requirement to obtain the calibration data. The calibration data may include position information of a preset calibration object in an image coordinate system and pose information of the execution end in a base coordinate system. For example, the calibration data may include the position information of the preset calibration object under the image coordinate system that is obtained from each operating space point, and the posture information of the execution end of the robot under the base coordinate system. The position information of the preset calibration object under the image coordinate system may be obtained by detecting, through the image detection device, the position information of the calibration object when the execution end of the robot is controlled to move to the corresponding operating space point. The posture information of the execution end of the robot under the base coordinate system may be obtained through the robot's own detection.

In one embodiment, the executing robot may be a robot with the eye (i.e., the image detection device) separated from the hand, that is, the robot having the image detection device (e.g., a camera) disposed on a fixed base (e.g., a fixed operation platform) of the robot, where the image detection device will not move with the movement of the execution end of the robot. The executing robot may also be a robot with the eye on the hand, that is, the robot having the image detection device disposed on the execution end of the robot, where the image detection device will move with the movement of the execution end of the robot. For the robot with the eye separated from the hand, the preset calibration object may be disposed at the execution end of the robot, and the image detection device may be disposed under the fixed base, then a relative motion can be generated between the preset calibration object and the image detection device by controlling the execution end to move to the operating space point that meets the preset requirement. The calibration data may be obtained by obtaining, from each operating space point, the position information of the preset calibration object under the image coordinate system and the posture information of the preset calibration object on the execution end of the robot under the base coordinate system. For the robot with the eye on the hand, the preset calibration object may be fixed on the fixed base, and the image detection device may be disposed at the execution end of the robot. By controlling the execution end to move to the operating space point meeting the preset requirement, a relative motion can be generated between the preset calibration object and the image detection device. The calibration data obtained by obtaining, at each operating space point, the position information of the preset calibration object under the image coordinate system, and obtaining the posture information of the execution end under the base coordinate system based on a movement parameter of the execution end, where the base coordinate system is a coordinate system established on the fixed base of the robot.

In one embodiment, before step 103 of obtaining the calibration data by controlling the execution end to move to the operation space points meeting the preset requirement, the method may further include: determining whether the execution end can move to each of the operation space points; and determining each of the operating space points as meeting a preset requirement, in response to a determination that the execution end can move to each of the operating space points.

In this embodiment, before step 103 of obtaining the calibration data by controlling the execution end to move to the operation space points meeting the preset requirement, it may first determine whether each operation space point meets the preset requirement by determining the reachability of the operation space point. If the execution end of the robot can move to the operating space point, it will determine that the operating space point meets the preset requirement. Otherwise, if the execution end of the robot cannot move to the operating space point, it will determine that the operating space point does not meet the preset requirement.

In one embodiment, since the actual operation space of the execution end is usually irregular in shape, the operation space points obtained during the above-mentioned discretization may not be reachable. Hence, an inverse solution operation may be performed on each discretized operation space point to determine whether the position is reachable. If the operation space point is not reachable, it will be deleted from a sampling candidate set, so that the execution end will not be controlled to move to the operation space point. The reachability criterion may be determined based on $\forall q \in R^a \text{ s.t. } FK(q)=x_d$, which may be understood as whether there is an operation space point q in the n sub-operation space positions so that the distance calculated based on the forward kinematics function FK(q) of the robot is equal to the distance $x_d$ of the operation space point that is calculated through the gridded preset distance sampling interval. If yes, it is determined as reachable; otherwise, it is determined as unreachable.

Figure 3:
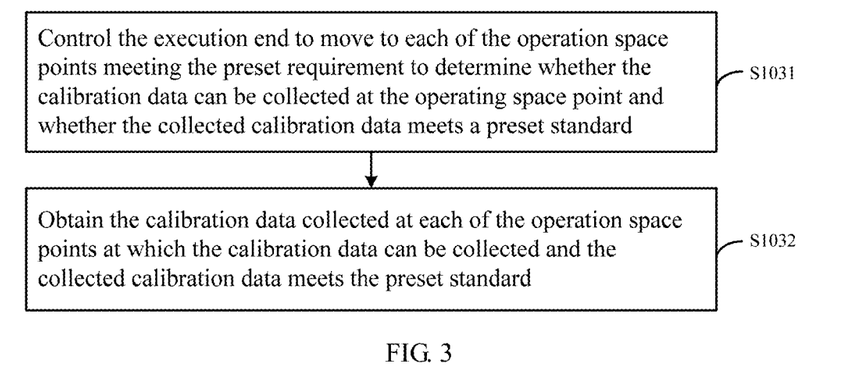
FIG. 3 is a flow chart of step S103 of the robot calibration method of FIG. 1.

FIG. 3 is a flow chart of step S103 of the robot calibration method of FIG. 1. As shown in FIG. 3, in this embodiment, step S103 of obtaining the calibration data by controlling the execution end to move to the operation space points meeting the preset requirement may include sub-steps S1031-S1032:

S1031: controlling the execution end to move to each of the operation space points meeting the preset requirement to determine whether the calibration data can be collected at the operating space point and whether the collected calibration data meets a preset standard.

In this embodiment, because the calibration data may not be detectable or available when the robot is at a certain operating space point while the operating space point is reachable, the availability of the operating space point has to be determined first. The availability indicates whether the calibration data can be collected at the corresponding operating space point, and whether the collected calibration data meets a preset standard. It may determine whether the calibration data can be collected by making the execution end to move to each of the operation space points that meets the preset requirement so as to check whether the pose of the execution end in the operation space point that meets the preset requirement is measurable. If no, the corresponding operation space point may be deleted from the sampling candidate set, that is, the calibration data corresponding to the operation space point will not be collected. In order to determine whether the collected calibration data meets the preset standard so as to ensure the stability of the sampled data, the criteria for determining the availability may be set in advance to determine whether the collected calibration data meet the preset standard.

For the case with the eye separated from the hand, the calibration object is disposed at the execution end, and whether the collected calibration data meets the preset standard may be determined by judging, through the movement parameters, the position of the calibration object at the Z axis of an execution end coordinate system to ensure the position is larger than zero, thereby ensuring the stability of the measured posture (which is important in practical applications because at some positions, the detection of the posture of the calibration object is incorrect while the camera can detect the calibration object, therefore the calibration object preferably extends out of the execution end a certain distance).

For the case with the eye on the hand, the image detection device is disposed at the execution end, and whether the collected calibration data meets the preset standard may be determined by judging the position of the image detection device at the Z axis of the execution end coordinate system to ensure the position is larger than zero, thereby ensuring the stability of the measured posture.

S1032: obtaining the calibration data collected at each of the operation space points at which the calibration data can be collected and the collected calibration data meets the preset standard.

In this embodiment, the operating space points where the calibration data can be collected and the collected calibration data meets the preset standard may be a set of available sampled points, and the calibration data is collected from the set of available sampled points in the operating space points.

S104: calibrating the hand and the image detection device of the robot based on the obtained calibration data.

In this embodiment, the calibrating the hand and the image detection device of the robot may include calculating an extrinsic parameter of the camera (i.e., the image detection device). The hand and the image detection device may be calibrated by converting to a constraint relationship of AiX=XBi for solving. For example, when a fixed device is fixed on the execution end of the robot, the fixed device on the robot with the eye on the hand may be the image detection device, and the fixed device on the robot with the eye separated from the hand may be the calibration object. The goal of solving the problem of calibrating the hand and the eye is to obtain, through the movement of the fixed device, a pose change relationship X between the image detection device and the execution end. Assumed that the fixed device has K+1 positions, where K≥2 and is an integer, then K times of relative movements will be stored correspondingly. For example, a transformation relationship for the relative movement transposed by the execution end in these K times of movements is Bi, where i=1, . . . , K, which may be obtained by a control device of the robot itself based on the movement parameter of the robot. T change relationship Ai, where i=1, . . . , K of the K times of relative movements of the camera may be obtained through the position information of the calibration object that is observed and collected by the image detection device during the K times of relative movements, and the pose change relationship X may be calculated through the constraint relationship of the calibration of the hand and the image detection device, then the extrinsic parameters of the camera may be obtained from the pose change relationship X.

Figure 4:
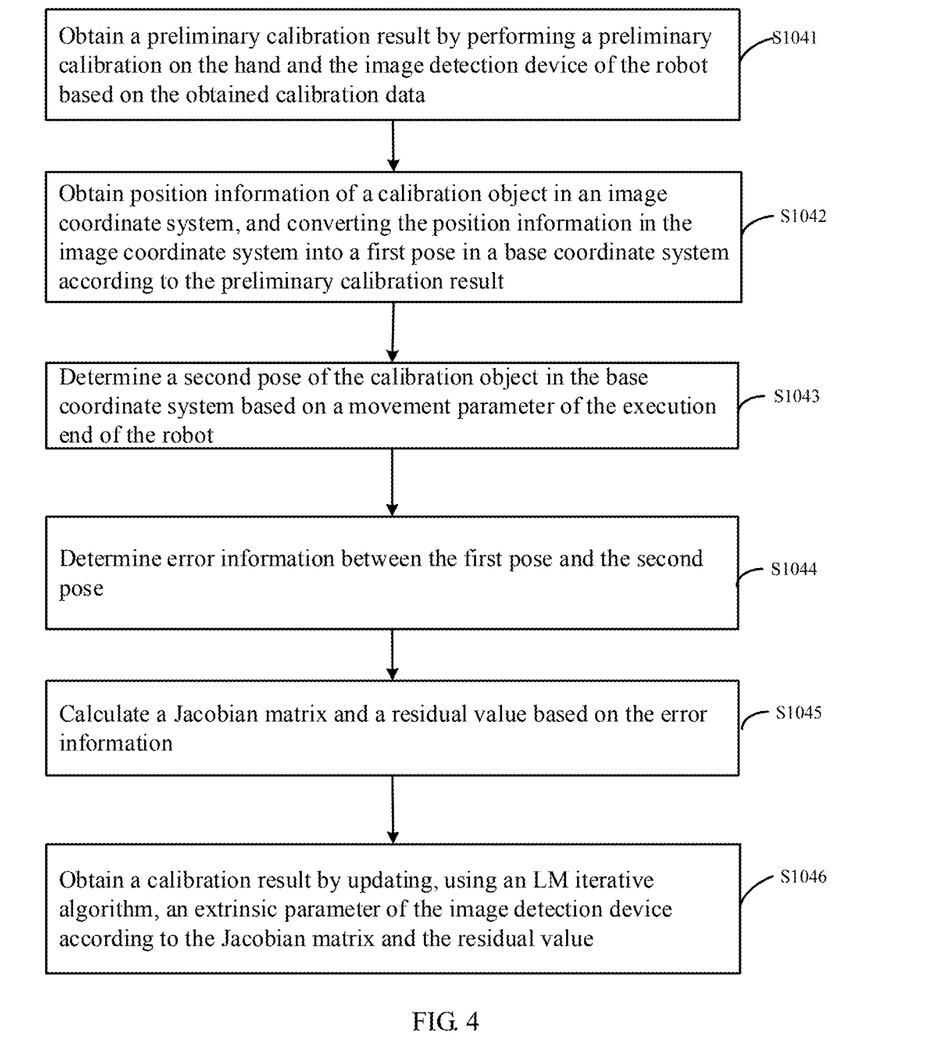
FIG. 4 is a flow chart of step S104 of the robot calibration method of FIG. 1.

FIG. 4 is a flow chart of step S104 of the robot calibration method of FIG. 1. As shown in FIG. 4, in one embodiment, step S104 of calibrating the hand and the image detection device of the robot based on the obtained calibration data may include sub-steps S1041-S1046:

S1041: obtaining a preliminary calibration result by performing a preliminary calibration on the hand and the image detection device of the robot based on the obtained calibration data In this embodiment, after step S104 of calibrating the hand and the image detection device of the robot based on the obtained calibration data, since there may be errors in the calibration, the obtained calibration result may be obtained to take as the preliminary calibration result.

S1042: obtaining position information of a calibration object in an image coordinate system, and converting the position information in the image coordinate system into a first pose in a base coordinate system according to the preliminary calibration result.

In this embodiment, the position information under the image coordinate system of the calibration object is obtained through the image detection device, which may be converted, through the preliminary calibration result, into the pose under the base coordinate system, that is, the pose of the calibration object in reality.

S1043: determining a second pose of the calibration object in the base coordinate system based on a movement parameter of the execution end of the robot.

In this embodiment, the control device of the robot itself determines the second pose of the calibration object under the base coordinate system based on the movement parameter of the execution end of the robot, that is, based on the kinematics algorithm, the robot may know the second pose of the calibration object under the base coordinate system.

S1044: determining error information between the first pose and the second pose.

S1045: calculating a Jacobian matrix and a residual value based on the error information.

In one embodiment, the error information may include an error matrix, S1045 of calculating the Jacobian matrix and the residual value based on the error information may include: obtaining the Jacobian matrix by deriving the error matrix; and obtaining the residual value by calculating the error matrix In this embodiment, it may obtain the error matrix (which may also be regarded as a polynomial function) by subtracting the parameter matrices corresponding to the first pose and the second pose, respectively, obtain the Jacobian matrix by deriving the error matrix; and obtain the residual value by calculating the error matrix.

S1046: obtaining a calibration result by updating, using an Levenberg-Marquardt (LM) iterative algorithm, an extrinsic parameter of the image detection device according to the Jacobian matrix and the residual value.

In this embodiment, it may use the Jacobian matrix, the residual value, and the extrinsic parameters of the preliminary calibration result as the independent variables of the corresponding formula of the LM iterative algorithm and the extrinsic parameter need to be updated as the dependent variable, and obtain the accurate calibration result by updating the extrinsic parameter of the camera through the LM iterative algorithm.

In one embodiment, step S1046 of obtaining a calibration result by updating, using the LM iterative algorithm, the extrinsic parameter of the image detection device according to the Jacobian matrix and the residual value may include: updating, using the LM iterative algorithm, the extrinsic parameter of the image detection device according to the Jacobian matrix and the residual value, taking the updated extrinsic parameter as the preliminary calibration result, and returning to the step of converting the position information in the image coordinate system into a first pose in a base coordinate system according to the preliminary calibration result until a number of updating the extrinsic parameter of the image detection device reaches a preset threshold or error information is determined to be within a preset error range; and taking the latest updated extrinsic parameter of the image detection device as the accurate calibration result.

In this embodiment, because it is not necessarily that each calibration result obtained by updating, using the LM iterative algorithm, the extrinsic parameters of the camera is the final accurate calibration result, step S1042 and its subsequent steps may be re-executed after each iteration. Until the times of iterative updates reaches the preset threshold or the error information is determined as within the preset error range, the current updated extrinsic parameter may use as the accurate calibration result.

In this embodiment of the present disclosure, it obtains operation space information of the execution end of the robot; obtains operation space points after gridding an operation space of the robot by gridding the operation space based on the operation space information; obtains calibration data by controlling the execution end to move to the operation space points meeting a preset requirement; and calibrates the hand and the image detection device of the robot based on the obtained calibration data. In this manner, the operation space points are determined by gridding the operation space based on the operation space information, and the execution end can be automatically controlled to move to the operation space points that meet the preset requirements so as to obtain the calibration data in an automatic and accurate manner, thereby simplifying the calibration process and improving the efficiency.

Figure 5:
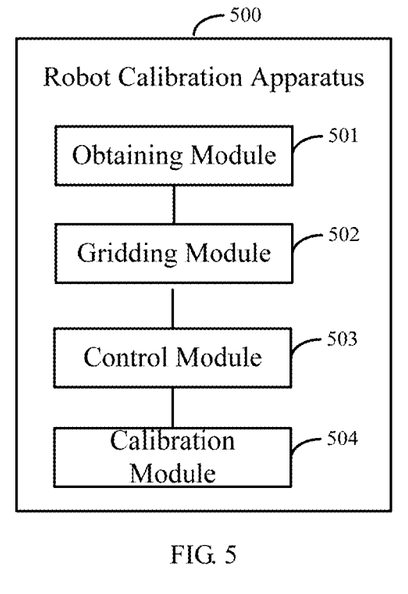
FIG. 5 is a schematic block diagram of the structure of a robot calibration apparatus according to an embodiment of the present disclosure.

FIG. 5 is a schematic block diagram of the structure of a robot calibration apparatus according to an embodiment of the present disclosure. In this embodiment, a robot calibration apparatus 500 is also provided, which is configured to execute the steps in the above-mentioned robot calibration method. The robot calibration apparatus may be a virtual appliance in a terminal device that is executed by a processor of the terminal device, or may be the terminal device itself. As shown in FIG. 5, the robot calibration apparatus 500 may include:

an obtaining module 501 configured to obtain operation space information of the execution end of the robot;

a gridding module 502 configured to obtain operation space points by grid the operation space based on the operation space information;

a control module 503 configured to obtain calibration data by controlling the execution end to move to the operation space points meeting a preset requirement; and a calibration module 504 configured to calibrate the hand and the image detection device of the robot based on the obtained calibration data.

In one embodiment, the gridding module 502 may include:

a first determination unit configured to determine three-dimensional information of the operation space based on the operation space information;

a division unit configured to obtain a plurality of sub-operation space positions by performing grid division on the operation space at a preset distance sampling interval based on the three-dimensional information;

a second determination unit configured to determine, at a preset angle sampling interval, a posture amount of the execution end at each of the sub-operation space positions; and a first obtaining unit configured to obtain a total amount of the operation space points based on the posture amount of the execution end at each of the sub-operation space positions and the sub-operation space positions.

In one embodiment, the robot calibration apparatus 500 may further include:

a third determination unit configured to determine whether the execution end can move to each of the operation space points; and a movement unit configured to determine each of the operating space points as meeting a preset requirement, in response to a determination that the execution end can move to each of the operating space points.

In one embodiment, the control module 503 may include:

a determination unit configured to control the execution end to move to each of the operation space points meeting the preset requirement to determine whether the calibration data can be collected at the operating space point and whether the collected calibration data meets a preset standard; and a second obtaining unit configured to obtain the calibration data collected at each of the operation space points at which the calibration data can be collected and the collected calibration data meets the preset standard.

In one embodiment, the calibration module 504 may include:

a preliminary calibration unit configured to obtain a preliminary calibration result by performing a preliminary calibration on the hand and the image detection device of the robot based on the obtained calibration data;

a conversion unit configured to obtain position information of a calibration object in an image coordinate system, and converting the position information in the image coordinate system into a first pose in a base coordinate system according to the preliminary calibration result;

a fourth determination unit configured to determine a second pose of the calibration object in the base coordinate system based on a movement parameter of the execution end of the robot;

a fifth determination unit configured to determine error information between the first pose and the second pose;

a calculation unit configured to calculate a Jacobian matrix and a residual value based on the error information; and an accurate calibration unit configured to obtain an accurate calibration result by updating, using an LM iterative algorithm, an extrinsic parameter of the image detection device according to the Jacobian matrix and the residual value.

In one embodiment, the accurate calibration unit may be configured to update, using the LM iterative algorithm, the extrinsic parameter of the image detection device according to the Jacobian matrix and the residual value, take the updated extrinsic parameter as the preliminary calibration result, and return to the step of converting the position information in the image coordinate system into a first pose in a base coordinate system according to the preliminary calibration result until a number of updating the extrinsic parameter of the image detection device reaches a preset threshold or error information is determined to be within a preset error range; and take the latest updated extrinsic parameter of the image detection device as the accurate calibration result.

In one embodiment, the error information may include an error matrix, and the calculation unit may be configured to obtain the Jacobian matrix by deriving the error matrix; and obtain the residual value by calculating the error matrix.

In this embodiment of the present disclosure, it obtains operation space information of the execution end of the robot; obtains operation space points after gridding an operation space of the robot by gridding the operation space based on the operation space information; obtains calibration data by controlling the execution end to move to the operation space points meeting a preset requirement; and calibrates the hand and the image detection device of the robot based on the obtained calibration data. In this manner, the operation space points are determined by gridding the operation space based on the operation space information, and the execution end can be automatically controlled to move to the operation space points that meet the preset requirements so as to obtain the calibration data in an automatic and accurate manner, thereby simplifying the calibration process and improving the efficiency.

Figure 6:
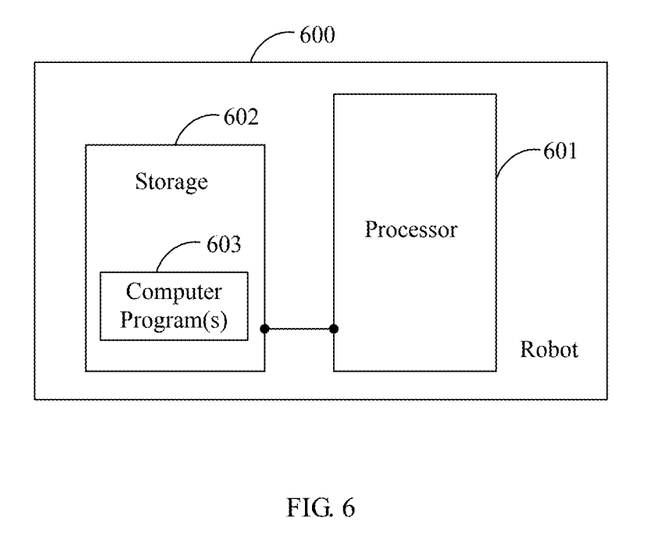
FIG. 6 is a schematic block diagram of the structure of a robot according to an embodiment of the present disclosure.

FIG. 6 is a schematic block diagram of the structure of a robot according to an embodiment of the present disclosure. As shown in FIG. 6, in this embodiment, a robot 600 is provided. The robot 600 may include a processor 601, a storage 602, and a computer program 603 stored in the storage 602 and executable on the processor 601, for example, a robot calibration program. When executing (instructions in) the computer program 603, the processor 601 implements the steps in the above-mentioned embodiments of the robot calibration method. Alternatively, when the processor 601 executes the (instructions in) computer program 603, the functions of each module in the above-mentioned device embodiments, for example, the functions of the modules 501-504 shown in FIG. 5 are implemented.

Exemplarily, the computer program 603 may be divided into one or more modules s, and the one or more modules s are stored in the storage 602 and executed by the processor 601 to realize the present disclosure. The one or more modules s may be a series of computer program instruction sections capable of performing a specific function, and the instruction sections are for describing the execution process of the computer program 603 in the robot 600. For example, the computer program 603 may be divided into an obtaining module, a gridding module, a control module, and a calibration module. The function of each module has been described in the above-mentioned embodiments, which will not be repeated herein.

The robot 600 may be a robot with mobility. The robot 600 may include, but is not limited to, the processor 601 and the storage 602. It can be understood by those skilled in the art that FIG. 6 is merely an example of the robot 600 and does not constitute a limitation on the robot 600, and may include more or fewer components than those shown in the figure, or a combination of some components or different components. For example, the robot 600 may further include an input I output device, a network access device, a bus, and the like.

The processor 601 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 602 may be an internal storage unit of the robot 600, for example, a hard disk or a memory of the robot 600. The storage 602 may also be an external storage device of the robot 600, for example, a plug-in hard disk, a smart media card (SMC), a secure digital (SD) card, flash card, and the like, which is equipped on the robot 600. Furthermore, the storage 602 may further include both an internal storage unit and an external storage device, of the robot 600. The storage 602 is configured to store the computer program 603 and other programs and data required by the robot 600. The storage 602 may also be used to temporarily store data that has been or will be output.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/robot and method may be implemented in other manners. For example, the above-mentioned apparatus/robot embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated module is implemented in the form of a software functional unit and is sold or used as an independent product, the integrated module may be stored in a non-transitory computer readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer readable storage medium, which may implement the steps of each of the above-mentioned method embodiments when executed by a processor. In which, the computer program includes computer program codes which may be the form of source codes, object codes, executable files, certain intermediate, and the like. The computer readable medium may include any entity or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented calibration method for a robot, wherein the robot comprises: an image detection device and an execution end with a hand, and wherein the method comprises:
    obtaining operation space information of the execution end of the robot, wherein the operation space information comprises three-dimensional information of an operation space of the execution end of the robot;
    obtaining operation space points by gridding the operation space based on the operation space information;
    obtaining calibration data by controlling the execution end to move to the operation space points meeting a preset requirement; and
    calibrating the hand and the image detection device of the robot based on the obtained calibration data;
    wherein obtaining the operation space points by gridding the operation space based on the operation space information comprises:
    obtaining the three-dimensional information of the operation space from the operation space information, wherein the three-dimensional information of the operation space comprises: information of length, width and height of the operation space;
    obtaining a plurality of sub-operation space positions by discretizing the operation space based on a preset distance sampling interval and the three-dimensional information of the operation space;
    obtaining a posture amount of the execution end at each of the sub-operation space positions by discretizing postures of the execution end at each of the sub-operation space positions based on a preset angle sampling interval, wherein the execution end of the robot has various postures at each of the sub-operation space positions; and
    obtaining a total amount of the operation space points based on the posture amount of the execution end at each of the sub-operation space positions and the sub-operation space positions.

2. The method of claim 1, wherein before obtaining the calibration data by controlling the execution end to move to the operation space points meeting the preset requirement, the method further comprises:
    determining whether the execution end can move to each of the operation space points; and
    determining each of the operating space points as meeting a preset requirement, in response to a determination that the execution end can move to each of the operating space points.

3. The method of claim 2, wherein determining whether the execution end can move to each of the operation space points comprises:
    determining whether there is an operation space point in the sub-operation space positions so that a distance calculated based on a forward kinematics function of the robot is equal to a distance of the operation space point that is calculated through the preset distance sampling interval; and
    when there is the operation space point in the sub-operation space positions, determining that the execution end can move to each of the operation space points.

4. The method of claim 1, wherein obtaining the calibration data by controlling the execution end to move to the operation space points meeting the preset requirement comprises:
    controlling the execution end to move to each of the operation space points meeting the preset requirement, and determining whether the calibration data can be obtained at each of the operation space points meeting the preset requirement and whether the obtained calibration data meets a preset standard; and
    obtaining the calibration data obtained at specific operation space points among the operation space points meeting the preset requirement, wherein the calibration data can be obtained at the specific operation space points, and the calibration data obtained at the specific operation space points meets the preset standard.

5. The method of claim 1, wherein calibrating the hand and the image detection device of the robot based on the obtained calibration data comprises:
    (1) obtaining a preliminary calibration result by performing a preliminary calibration on the hand and the image detection device of the robot based on the obtained calibration data;
    (2) obtaining position information of a calibration object in an image coordinate system;
    (3) converting the position information in the image coordinate system into a first pose in a base coordinate system according to the preliminary calibration result;
    (4) determining a second pose of the calibration object in the base coordinate system based on a movement parameter of the execution end of the robot;
    (5) determining error information between the first pose and the second pose;
    (6) calculating a Jacobian matrix and a residual value based on the error information; and
    (7) obtaining a calibration result by updating, using an Levenberg-Marquardt (LM) iterative algorithm, an extrinsic parameter of the image detection device according to the Jacobian matrix and the residual value.

6. The method of claim 5, wherein the step of (7) obtaining the calibration result by updating, using the LM iterative algorithm, the extrinsic parameter of the image detection device according to the Jacobian matrix and the residual value comprises:
  (7-1) updating, using the LM iterative algorithm, the extrinsic parameter of the image detection device according to the Jacobian matrix and the residual value;
  (7-2) taking the updated extrinsic parameter as the preliminary calibration result, returning to the step (3), and repeating the steps (3) to (7) until a stop criteria of an iteration number of iterations run or error range is reached; and
  (7-3) taking the latest updated extrinsic parameter of the image detection device as the calibration result.

7. The method of claim 5, wherein the error information includes an error matrix, and wherein calculating the Jacobian matrix and the residual value based on the error information comprises:
  obtaining the Jacobian matrix by deriving the error matrix; and
  obtaining the residual value by calculating the error matrix.

8. The method of claim 1, wherein obtaining the plurality of sub-operation space positions by discretizing the operation space based on the preset distance sampling interval and the three-dimensional information of the operation space comprises:
  performing division at intervals of the preset distance sampling interval in each dimension to discretize the operation space into n sub-operation space positions; wherein n=l/δd×w/δd×h δd,
  where l is the length, w is the width, h is the height, and δd is the preset distance sampling interval.

9. The method of claim 8, wherein each of the sub-operation space positions at the preset angle sampling interval is sampled, and the amount of the postures discretized from each of the sub-operating space positions is m;
  wherein m=2π/δα×π π/δα×2π/δα, where δα is the preset angle sampling interval; and
  wherein the total amount of the operation space points is c, where c=m×n.

10. A robot, comprising:
  an execution end with a hand;
  an image detection device;
  a processor;
  a memory coupled to the processor; and
  one or more computer programs stored in the memory and executable on the processor;
  wherein, the one or more computer programs comprise:
  instructions for obtaining operation space information of the execution end of the robot, wherein the operation space information comprises three-dimensional information of an operation space of the execution end of the robot;
  instructions for obtaining operation space points by gridding the operation space based on the operation space information;
  instructions for obtaining calibration data by controlling the execution end to move to the operation space points meeting a preset requirement; and
  instructions for calibrating the hand and the image detection device of the robot based on the obtained calibration data;
  wherein the instructions for obtaining the operation space points by gridding the operation space based on the operation space information comprise:
  instructions for obtaining the three-dimensional information of the operation space from the operation space information, wherein the three-dimensional information of the operation space comprises: information of length, width and height of the operation space;
  instructions for obtaining a plurality of sub-operation space positions by discretizing the operation space based on a preset distance sampling interval and the three-dimensional information of the operation space;
  instructions for obtaining a posture amount of the execution end at each of the sub-operation space positions by discretizing postures of the execution end at each of the sub-operation space positions based on a preset angle sampling interval, wherein the execution end of the robot has various postures at each of the sub-operation space positions; and
  instructions for obtaining a total amount of the operation space points based on the posture amount of the execution end at each of the sub-operation space positions and the sub-operation space positions.

11. The robot of claim 10, wherein, the one or more computer programs further comprises:
  instructions for determining whether the execution end can move to each of the operation space points; and
  instructions for determining each of the operating space points as meeting a preset requirement, in response to a determination that the execution end can move to the operating space point.

12. The robot of claim 10, wherein the instructions for obtaining the calibration data by controlling the execution end to move to the operation space points meeting the preset requirement comprise:
  instructions for controlling the execution end to move to each of the operation space points meeting the preset requirement, and determining whether the calibration data can be obtained at each of the operation space points meeting the preset requirement and whether the obtained calibration data meets a preset standard; and
  instructions for obtaining the calibration data obtained at specific operation space points among the operation space points meeting the preset requirement, wherein the calibration data can be obtained at the specific operation space points, and the calibration data obtained at the specific operation space points meets the preset standard.

13. The robot of claim 10, wherein calibrating the hand and the image detection device of the robot based on the obtained calibration data comprises:
  (1) obtaining a preliminary calibration result by performing a preliminary calibration on the hand and the image detection device of the robot based on the obtained calibration data;
  (2) obtaining position information of a calibration object in an image coordinate system;
  (3) converting the position information in the image coordinate system into a first pose in a base coordinate system according to the preliminary calibration result;
  (4) determining a second pose of the calibration object in the base coordinate system based on a movement parameter of the execution end of the robot;
  (5) determining error information between the first pose and the second pose;
  (6) calculating a Jacobian matrix and a residual value based on the error information; and
  (7) obtaining a calibration result by updating, using an Levenberg-Marquardt (LM) iterative algorithm, an extrinsic parameter of the image detection device according to the Jacobian matrix and the residual value.

14. The robot of claim 13, wherein the step of (7) obtaining the calibration result by updating, using the LM iterative algorithm, the extrinsic parameter of the image detection device according to the Jacobian matrix and the residual value comprises:

(7-1) updating, using the LM iterative algorithm, the extrinsic parameter of the image detection device according to the Jacobian matrix and the residual value;

(7-2) taking the updated extrinsic parameter as the preliminary calibration result, returning to the step (3), and repeating the steps (3) to (7) until a stop criteria of an iteration number of iterations run or error range is reached; and (7-3) taking the latest updated extrinsic parameter of the image detection device as the calibration result.

15. The robot of claim 13, wherein the error information includes an error matrix, and the instructions for calculating the Jacobian matrix and the residual value based on the error information comprise:

instructions for obtaining the Jacobian matrix by deriving the error matrix; and instructions for obtaining the residual value by calculating the error matrix.

16. A non-transitory computer-readable storage medium for storing one or more computer programs, wherein the one or more computer programs comprise:

instructions for obtaining operation space information of an execution end of a robot, wherein the robot has an image detection device and the execution end with a hand, and the operation space information comprises three-dimensional information of an operation space of the execution end of the robot;

instructions for obtaining operation space points by gridding the operation space based on the operation space information;

instructions for obtaining calibration data by controlling the execution end to move to the operation space points meeting a preset requirement; and instructions for calibrating the hand and the image detection device of the robot based on the obtained calibration data;

wherein the instructions for obtaining the operation space points by gridding the operation space based on the operation space information comprise:

instructions for obtaining the three-dimensional information of the operation space from the operation space information, wherein the three-dimensional information of the operation space comprises: information of length, width and height of the operation space;

instructions for obtaining a plurality of sub-operation space positions by discretizing the operation space based on a preset distance sampling interval and the three-dimensional information of the operation space;

instructions for obtaining a posture amount of the execution end at each of the sub-operation space positions by discretizing postures of the execution end at each of the sub-operation space positions based on a preset angle sampling interval, wherein the execution end of the robot has various postures at each of the sub-operation space positions; and instructions for obtaining a total amount of the operation space points based on the posture amount of the execution end at each of the sub-operation space positions and the sub-operation space positions.

17. The storage medium of claim 16 wherein, the one or more computer programs further comprises:

instructions for determining whether the execution end can move to each of the operation space points; and instructions for determining each of the operating space points as meeting a preset requirement, in response to a determination that the execution end can move to the operating space point.

18. The storage medium of claim 16, wherein the instructions for obtaining the calibration data by controlling the execution end to move to the operation space points meeting the preset requirement comprise:

instructions for controlling the execution end to move to each of the operation space points meeting the preset requirement, and determining whether the calibration data can be obtained at each of the operation space points meeting the preset requirement and whether the obtained calibration data meets a preset standard; and instructions for obtaining the calibration data obtained at specific operation space points among the operation space points meeting the preset requirement, wherein the calibration data can be obtained at the specific operation space points, and the calibration data obtained at the specific operation space points meets the preset standard.

19. The storage medium of claim 16, wherein calibrating the hand and the image detection device of the robot based on the obtained calibration data comprises:

(1) obtaining a preliminary calibration result by performing a preliminary calibration on the hand and the image detection device of the robot based on the obtained calibration data;

(2) obtaining position information of a calibration object in an image coordinate system;

(3) converting the position information in the image coordinate system into a first pose in a base coordinate system according to the preliminary calibration result;

(4) determining a second pose of the calibration object in the base coordinate system based on a movement parameter of the execution end of the robot;

(5) determining error information between the first pose and the second pose;

(6) calculating a Jacobian matrix and a residual value based on the error information; and (7) obtaining a calibration result by updating, using an Levenberg-Marquardt (LM) iterative algorithm, an extrinsic parameter of the image detection device according to the Jacobian matrix and the residual value.

20. The storage medium of claim 19, wherein the step of (7) obtaining the calibration result by updating, using the LM iterative algorithm, the extrinsic parameter of the image detection device according to the Jacobian matrix and the residual value comprises:

(7-1) updating, using the LM iterative algorithm, the extrinsic parameter of the image detection device according to the Jacobian matrix and the residual value;

(7-2) taking the updated extrinsic parameter as the preliminary calibration result, returning to the step (3), and repeating the steps (3) to (7) until a stop criteria of an iteration number of iterations run or error range is reached; and (7-3) taking the latest updated extrinsic parameter of the image detection device as the calibration result.

\* \* \* \* \*